(12) United States Patent
Chen

(10) Patent No.: US 7,496,461 B2
(45) Date of Patent: Feb. 24, 2009

(54) PARAMETERS CALIBRATING SYSTEM AND METHOD FOR OPTICAL DISC DRIVE

(75) Inventor: Ying-Che Chen, Shenzhen (CN)

(73) Assignee: Hon Hai Precison Industry Co., Ltd., Tu-Cheng, Taipei Hsien (TW)

( * ) Notice: Subject to any disclaimer, the term of this patent is extended or adjusted under 35 U.S.C. 154(b) by 264 days.

(21) Appl. No.: 11/309,528

(22) Filed: Aug. 17, 2006

(65) Prior Publication Data

US 2007/0121134 A1    May 31, 2007

(30) Foreign Application Priority Data

Nov. 25, 2005  (CN) .................... 2005 1 0101784

(51) Int. Cl.
*G01D 18/00* (2006.01)
(52) U.S. Cl. .................... 702/85; 702/127; 702/182
(58) Field of Classification Search .................. 702/85, 702/90, 107, 109, 120–123, 127, 182–185
See application file for complete search history.

(56) References Cited

U.S. PATENT DOCUMENTS

| | | | |
|---|---|---|---|
| 5,274,512 A | 12/1993 | Tanaka et al. | |
| 5,390,122 A * | 2/1995 | Michaels et al. | 701/200 |
| 7,020,854 B2 | 3/2006 | Killian et al. | |
| 2002/0101581 A1* | 8/2002 | Murakawa et al. | 356/138 |
| 2003/0048711 A1 | 3/2003 | Hirai | |
| 2005/0024999 A1* | 2/2005 | Hsiao | 369/44.32 |

* cited by examiner

Primary Examiner—Eliseo Ramos Feliciano
Assistant Examiner—Mi'schita' Henson
(74) Attorney, Agent, or Firm—Winston Hsu

(57) ABSTRACT

A parameters calibrating system is used for computing an optimal parameters value set for an optical disc drive. The parameters calibrating system includes a measuring apparatus, an input terminal, and a parameters calibrating apparatus. The measuring apparatus is used for measuring the optical disc drive to get an original parameters value set. The input terminal is used for entering constant factors and predetermined constraints. The parameters calibrating apparatus is used for computing the optimal parameters value set according to the original parameters value set, the constant factors, and the predetermined constraints, and outputting the optimal parameters value set to the optical disc drive. A parameters calibrating method for computing the optimal parameters value set is also disclosed.

12 Claims, 10 Drawing Sheets

PARAMETERS CALIBRATING SYSTEM AND METHOD FOR OPTICAL DISC DRIVE

1. FIELD OF THE INVENTION

The present invention generally relates to parameters calibrating systems and methods, and more particularly to a parameters calibrating system and a parameters calibrating method for computing parameters value for an optical disc drive.

2. DESCRIPTION OF RELATED ART

Autocontrol is widely used in electronic devices. A typical autocontrol system used for operating an object includes a controller and an operator. The controller is used for receiving a state signal of the operator and sending a control signal to the operator. The operator is used for receiving the control signal, operating the object based on the control signal, and feeding the state signal of the object back to the controller. The controller may vary the control signals according to the state signals.

An optical disc drive is an autocontrol system. The optical disc drive includes some motors, such as a spindle motor and a stepping motor for adjusting a focus point on an optical disc and for seeking a target track on the optical disc, and some corresponding equalizers for controlling these motors. Herein, the motors work as operators and the equalizers work as controllers.

During testing, optimal value should be initialized in the equalizer. In practice, engineers input trial parameters value into the equalizer; these trial parameters value are often initialized based on prior results and experience. A testing device is used to test the equalizer. If the equalizer errors and cannot satisfy specific requirements, engineers adjusts the trial parameters value of the equalizer and the equalizer is tested again. This procedure is repeated again until the equalizer satisfies the specific requirements. However, this is a very time consuming process for engineers because they have to spend lots of time on adjustments and testing.

Therefore, a parameters calibrating system and method for an optical disc drive are needed in the industry to address the aforementioned deficiencies and inadequacies.

SUMMARY OF THE INVENTION

A parameters calibrating system is used for computing an optimum parameters value set for an optical disc drive. The parameters calibrating system includes a measuring apparatus, an input terminal, and a parameters calibrating apparatus. The measuring apparatus is used for measuring the optical disc drive to get an original parameters value set. The input terminal is used for entering constant factors and predetermined constraints. The parameters calibrating apparatus is used for computing the optimum parameters value set according to the original parameters value set, the constant factors, and the predetermined constraints, and outputting the optimum parameters value set to the optical disc drive. A parameters calibrating method for computing the optimum parameters value set is also disclosed.

Other systems, methods, features, and advantages of the present parameters calibrating system and method will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present parameters calibrating apparatus and method can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe a preferred embodiment of the present parameters calibrating system and preferred embodiments of the present parameters calibrating method.

Figure 1:
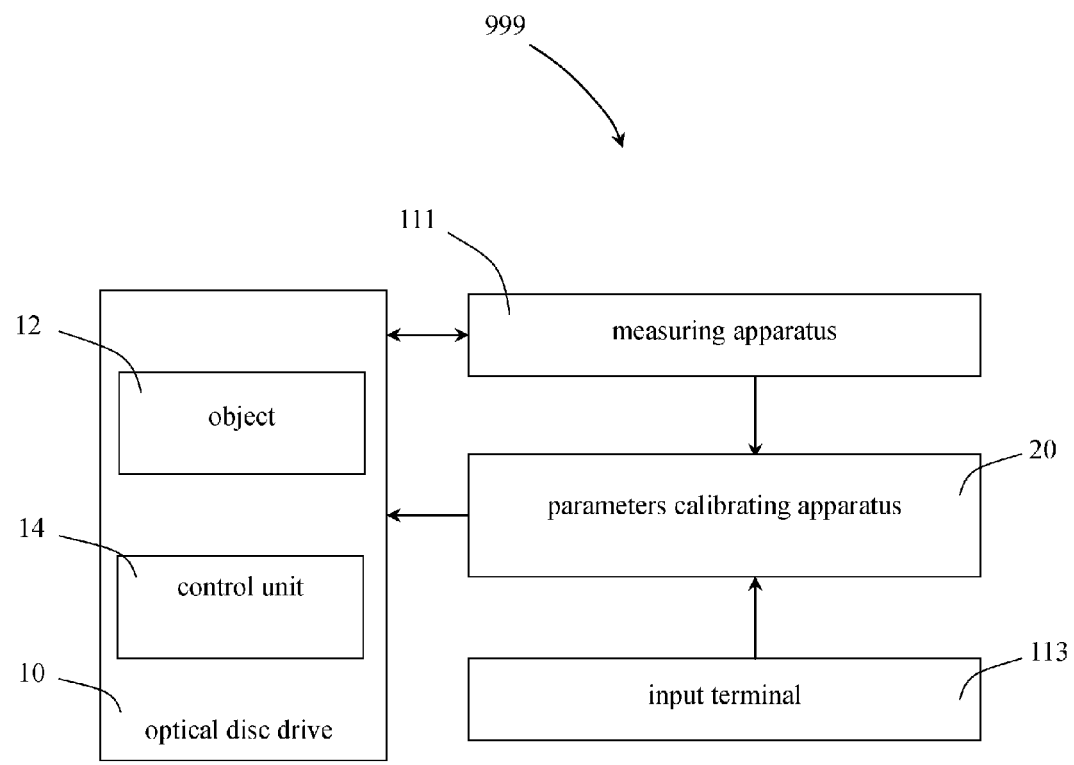
FIG. 1 is a block diagram illustrating a parameters calibrating system for computing an optimal parameters value set of an optical disc drive in accordance with an exemplary embodiment, the parameters calibrating system including a parameters calibrating apparatus.

Referring to FIG. 1, a parameters calibrating system 999 in accordance with a preferred embodiment is used for computing optimal parameters value set for an optical disc drive 10. The optical disc drive 10 includes a control unit 14 controlling an object 12 to accomplish specified operations such as focusing operations and tracking operations.

The parameters calibrating system 999 includes a measuring apparatus 111, an input terminal 113 and a parameters calibrating apparatus 20. The measuring apparatus 11 is used for measuring the control unit 14 to obtain an original parameters value set of the control unit 14 and an integrable original parameters value set of the control unit 14 and the object 12. The measuring apparatus 111 is also used for sending the original parameters value set and the integrable original parameters value set to the parameters calibrating apparatus 20. The input terminal 113 is used for inputting constant factors, predetermined constraints, a selection signal, and a pending parameters value set. The parameters calibrating apparatus 20 is used for computing the optimal parameters value set according to the original parameters value set, the constant factors, and the predetermined constraints, and for outputting the optimal parameters value set to the control unit 14. The constant factors include a rotational speed of the optical disc drive 10, calculating formula, and an initial setting of the parameters calibrating system 999. The predetermined constraints include a phase margin, a predetermined bandwidth, and a gain crossover frequency.

Figure 2:
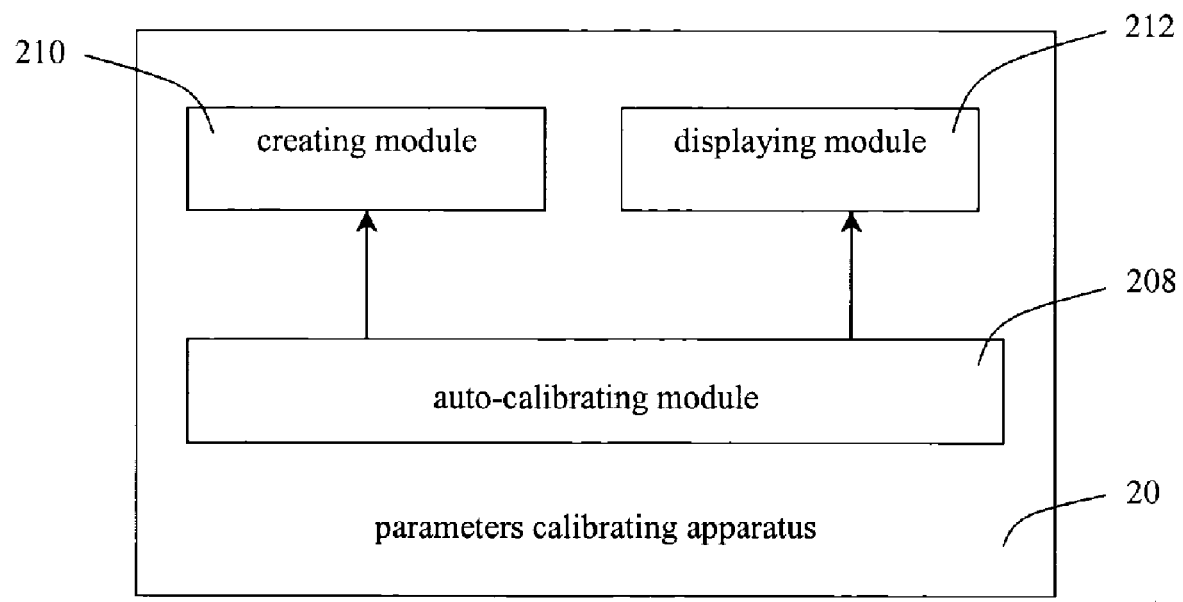
FIG. 2 is a block diagram illustrating the parameters calibrating apparatus of FIG. 1 in accordance with a first preferred embodiment, the parameters calibrating apparatus including an auto-calibrating module.

Referring to FIG. 2, the parameters calibrating apparatus 20 in accordance with a first preferred embodiment includes an auto-calibrating module 208, a creating module 210, and a displaying module 212.

The auto-calibrating module 208 is used for receiving the original parameters value set, the constant factors and the predetermined constraints. The auto-calibrating module 208 is also used for computing the optimal parameters value set based on a genetic algorithm (GA), the constant factors, and the predetermined constraints. The auto-calibrating module is further used for sending the optimal parameters value set to the creating module 210 and the displaying module 212.

The creating module 210 is used for recording the optimal parameters value set into a value file having a predetermined format, and recording the value file into the control unit 14. The displaying module 212 is used for displaying bode plots of the original parameters value set and the optimal parameters value set so as to visibly compare the optimal parameters value set with the original parameters value set.

Figure 3:
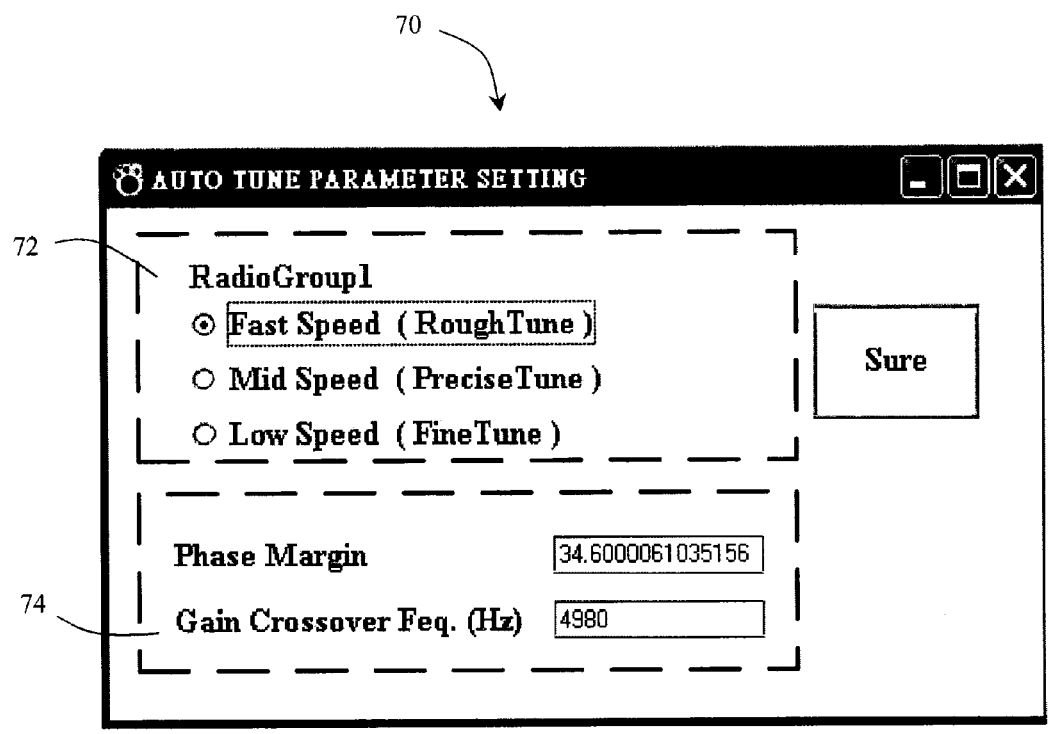
FIG. 3 is a schematic diagram showing a first interface of the parameters calibrating apparatus of FIG. 2.

Referring to FIG. 3, the auto-calibrating module 208 includes a first interface 70 for receiving the constant factors and the predetermined constraints. The first interface 70 includes a conditional setting 72 and a constraint setting 74. In this embodiment, the conditional setting 72 receives the initial setting, and the constraint setting 74 receives given value of the phase margin and the gain crossover frequency.

Figure 4:
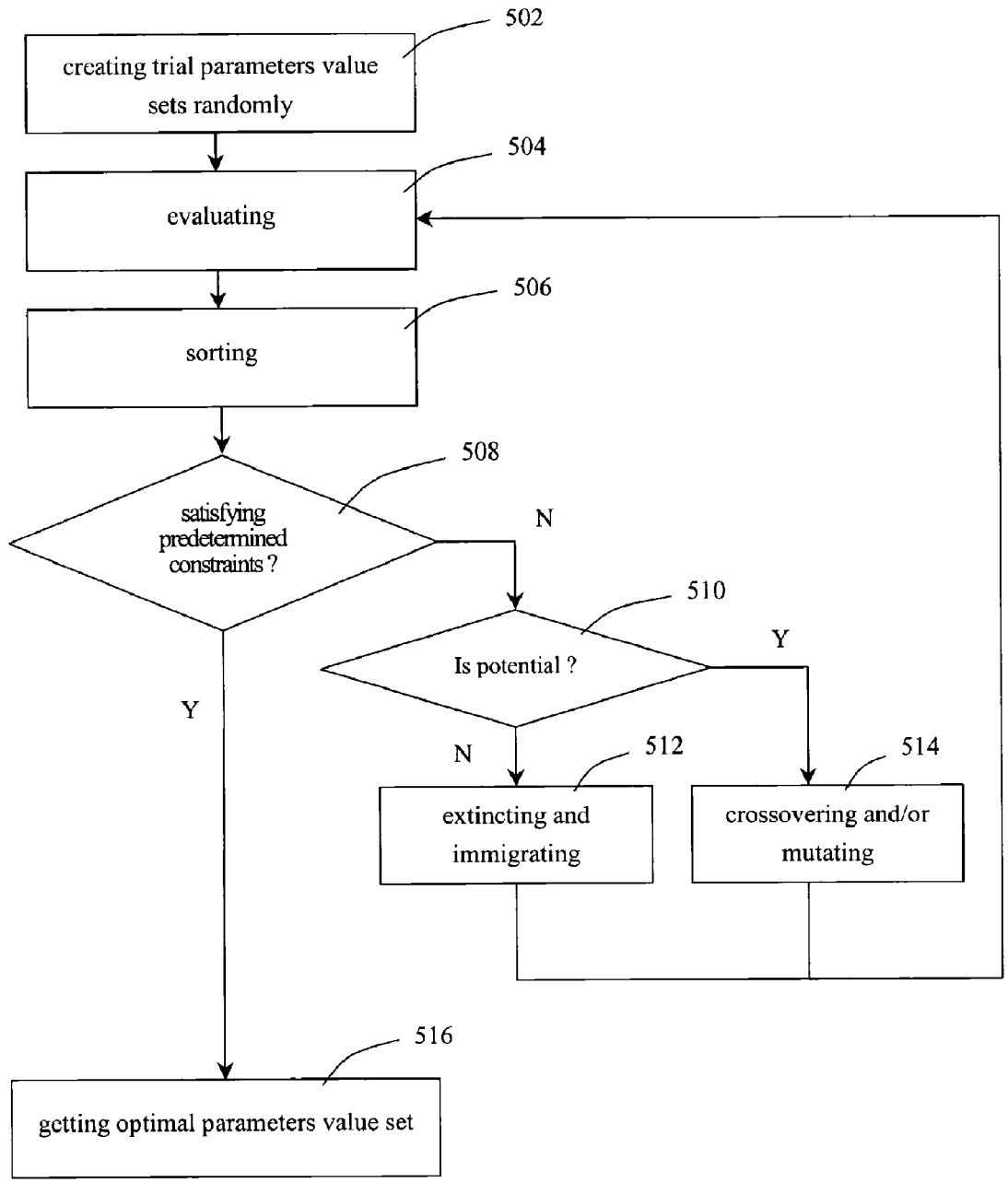
FIG. 4 is a process flow diagram of how a genetic algorithm is implemented by the auto-calibrating module.

Referring to FIG. 4, a procedure of the GA used by the auto-calibrating module to compute the optimal parameters value set includes the following steps.

The auto-calibrating module 208 generates a plurality of trial parameters value sets randomly (step 502).

The auto-calibrating module 208 evaluates performances of each trial parameters value set based on the original parameters value set, the constant factors, and the predetermined constraints (step 504). Each trial parameters value set is given a performance value.

The auto-calibrating module 208 sorts the trial parameters value sets according to their performance value (step 506).

The auto-calibrating module 208 computes whether each trial parameters value set satisfies the predetermined constraints (step 508).

If there is a trial parameters value set not satisfying the predetermined constraints, the auto-calibrating module 208 computes whether there is potential for each unsatisfied trial parameters value set that can be adjusted to satisfy the predetermined constraints (step 510).

If there is no potential, the auto-calibrating module 208 executes extinction and immigration for the unsatisfied trial parameters value set. That is, the auto-calibrating module 208 deletes the unsatisfied trial parameters value set and creates a new trial parameters value set instead, and the procedure returns to step 504 (step 512).

If there is potential for the unsatisfied trial parameters value set, the auto-calibrating module 208 executes crossover and/or mutation for the unsatisfied trial parameters value set, and the procedure returns to step 504. Herein, crossover means that some value of an unsatisfied trial parameters value set are replaced with some value of another trial parameters value set, and mutation means that some value of an unsatisfied trial parameters value set are adjusted to some new value (step 514).

If there is a trial parameters value set satisfying the predetermined constraints, the auto-calibrating module 208 identifies the satisfied trial parameters value set as an optimal parameters value set (516).

Figure 5:
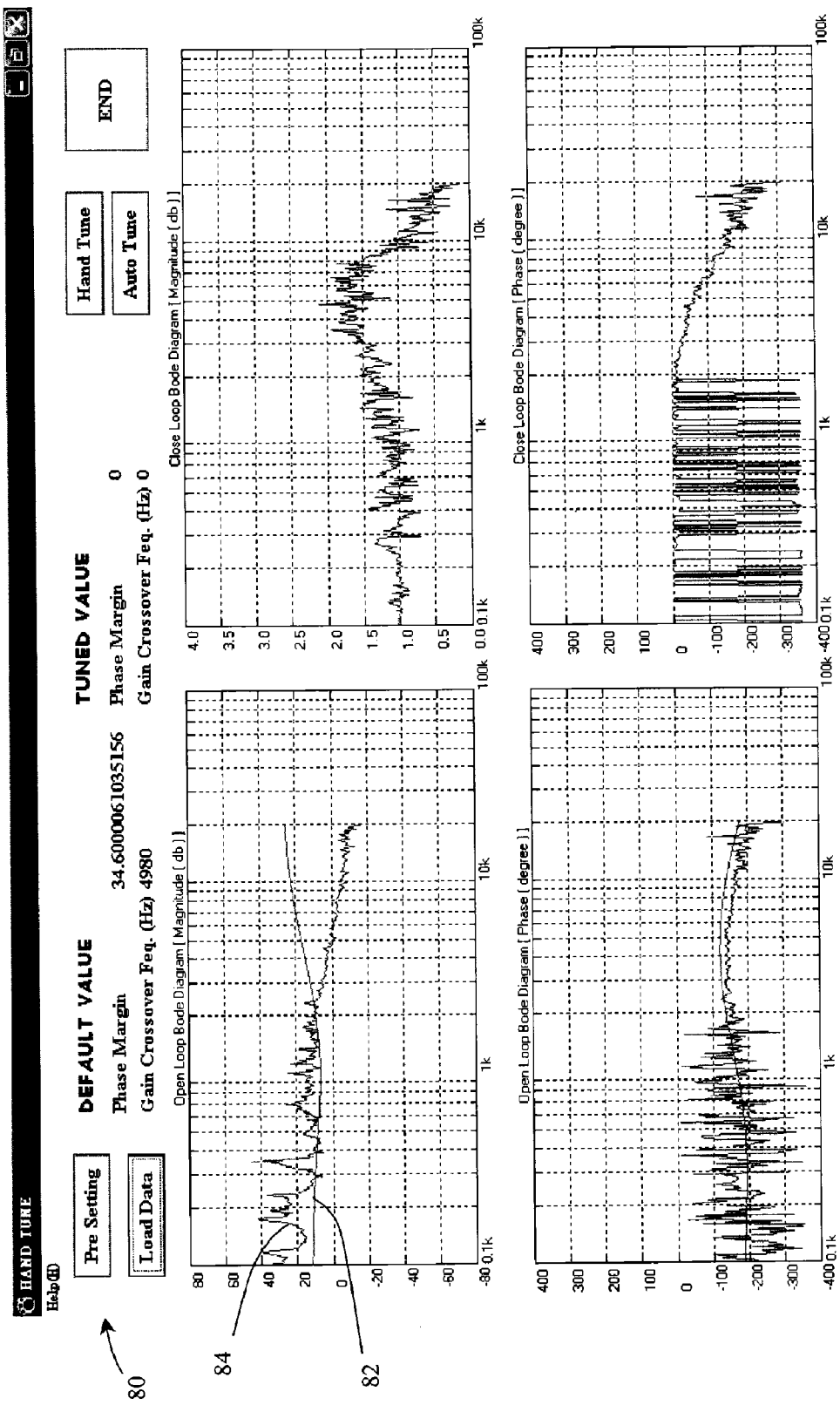
FIG. 5 is a bode plot of an original parameters value set of the optical disc drive.

Referring to FIG. 5, a bode plot 80 of the optical disc drive 10 is illustrated by the displaying module 212. The curve 82 shows the original parameters value set of the control unit 14, and the curve 84 shows the integrable original parameters value set of the control unit 14 and the object 12.

Figure 6:
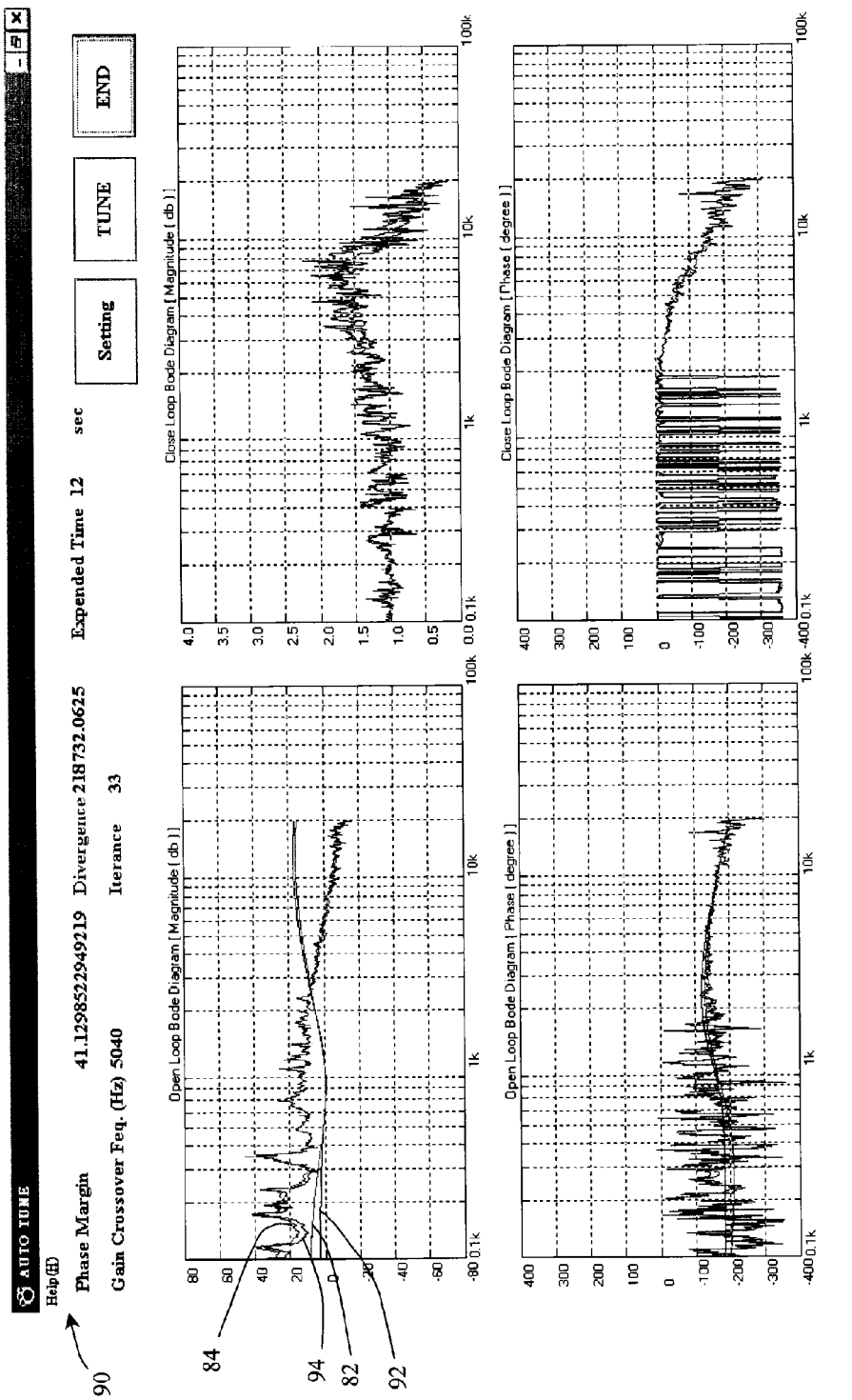
FIG. 6 is a bode plot illustrating the difference between the original parameters value set and the optimal parameters value set.

Referring to FIG. 6, a bode plot 90 of the optical disc drive 10 is illustrated by the displaying module 212. The curve 92 shows an optimal parameters value set of the control unit 14, and the curve 94 shows the integrable optimal parameters value set of the control unit 14 and object 14. A calibrated result can be clear by comparing the curve 92 and the curve 94 with the curve 82 and the curve 84.

Figure 7:
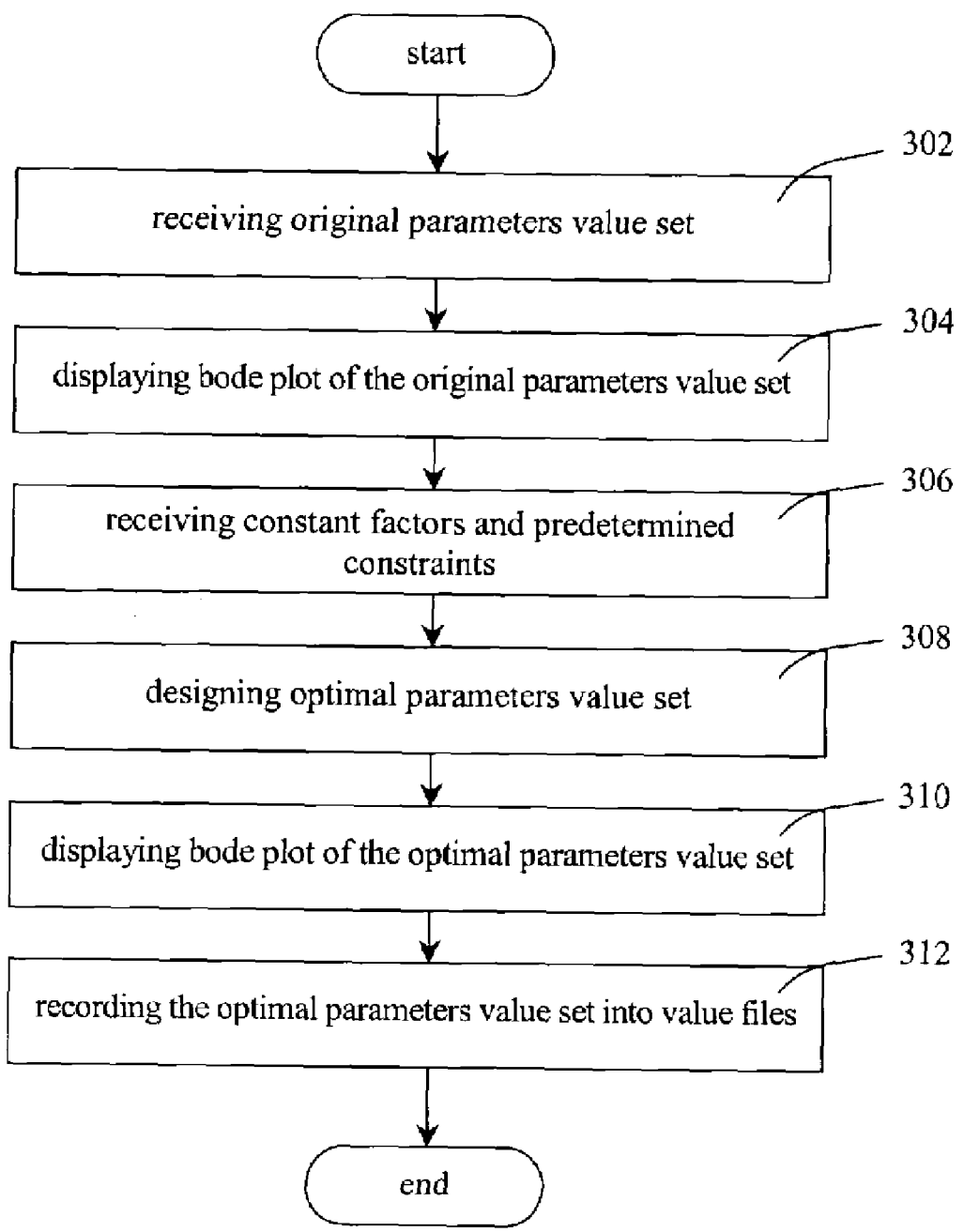
FIG. 7 is a process flow diagram illustrating a parameters calibrating method in accordance with a first preferred embodiment.

Referring to FIG. 7, a parameters calibrating method used by the parameters calibrating apparatus 20 in accordance with a first preferred embodiment includes the following steps.

The auto-calibrating module 208 receives an original parameters value set, and sends the original parameters value set to the displaying module 212 (step 302).

The displaying module 212 displays the bode plot 80 of the original parameters value set (step 304).

The auto-calibrating module 208 receives the constant factors and the predetermined constraints (step 306).

The auto-calibrating module 208 computes a plurality of optimal parameters value sets according to the original parameters value sets, the constant factors and the predetermined constraints based on the GA, and sends the optimal parameters value sets to the displaying module 212 (step 308).

The displaying module 212 displays the bode plots 90 of the optimal parameters value sets (step 310).

The auto-calibrating module 208 sends the optimal parameters value sets to the creating module 210, and the creating module 210 records the optimal parameters value sets into value files having the predetermined format (step 312).

In the first embodiment, because the auto-calibrating apparatus 20 uses the auto-calibrating module 208 to compute the optimal parameters value set automatically based on the GA, time is saved.

Figure 8:
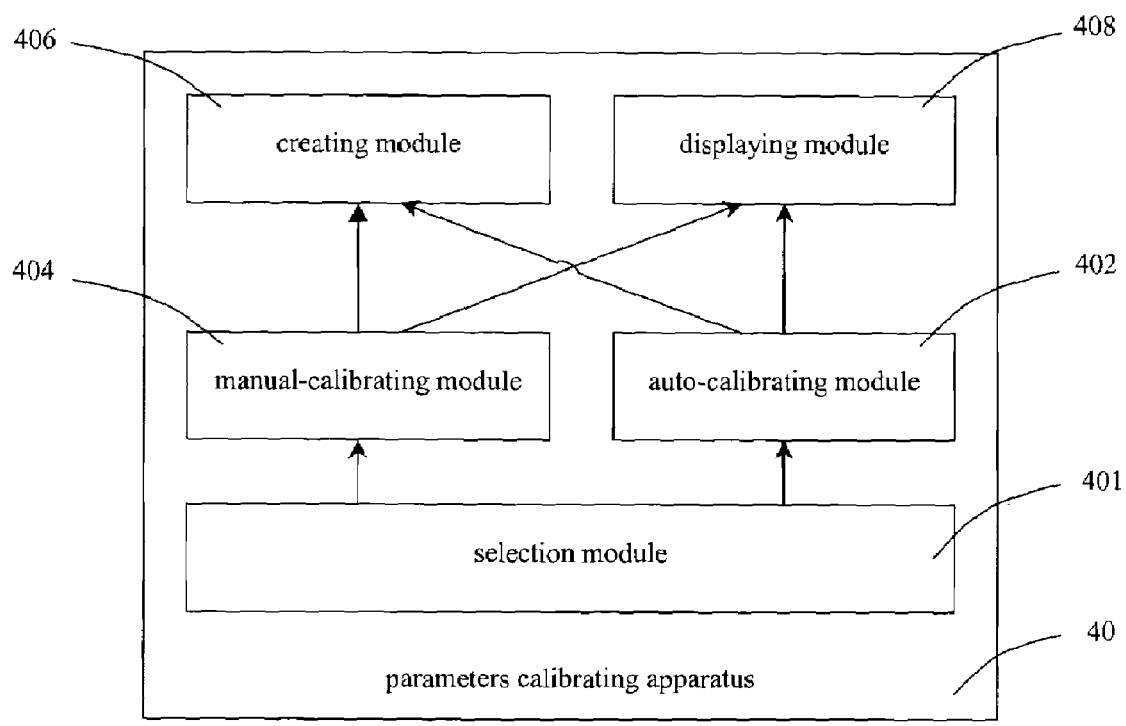
FIG. 8 is a block diagram illustrating the parameters calibrating apparatus of FIG. 1 in accordance with a second preferred embodiment.

Referring to FIG. 8, a parameters calibrating apparatus 40 in accordance with a second preferred embodiment includes a selection module 401, an auto-calibrating module 402, a manual-calibrating module 404, a creating module 406, and a displaying module 408. The selection module 401 is used for receiving the original parameters value set and a selection signal, and further used for selecting either the auto-calibrating module 402 or the manual-calibrating module 404 to be used.

The auto-calibrating module 402 has the same function with the auto-calibrating module 208.

The manual-calibrating module 404 is used for receiving the original parameters value set, the constant factors, the predetermined constraints, and a pending parameters value set. The manual-calibrating module 404 is further used for compute the optimal parameters value set manually, and sending the optimal parameters value set to the creating module 406 and the displaying module 408.

The creating module 406 is used for recording the optimal parameters value set into a value file having the predetermined format, and recording the value file into the control unit 14.

The displaying module 408 is used for displaying bode plots of the original parameters value set and the optimal parameters value set so as to visibly compare the optimal parameters value set with the original parameters value sets.

Figure 9:
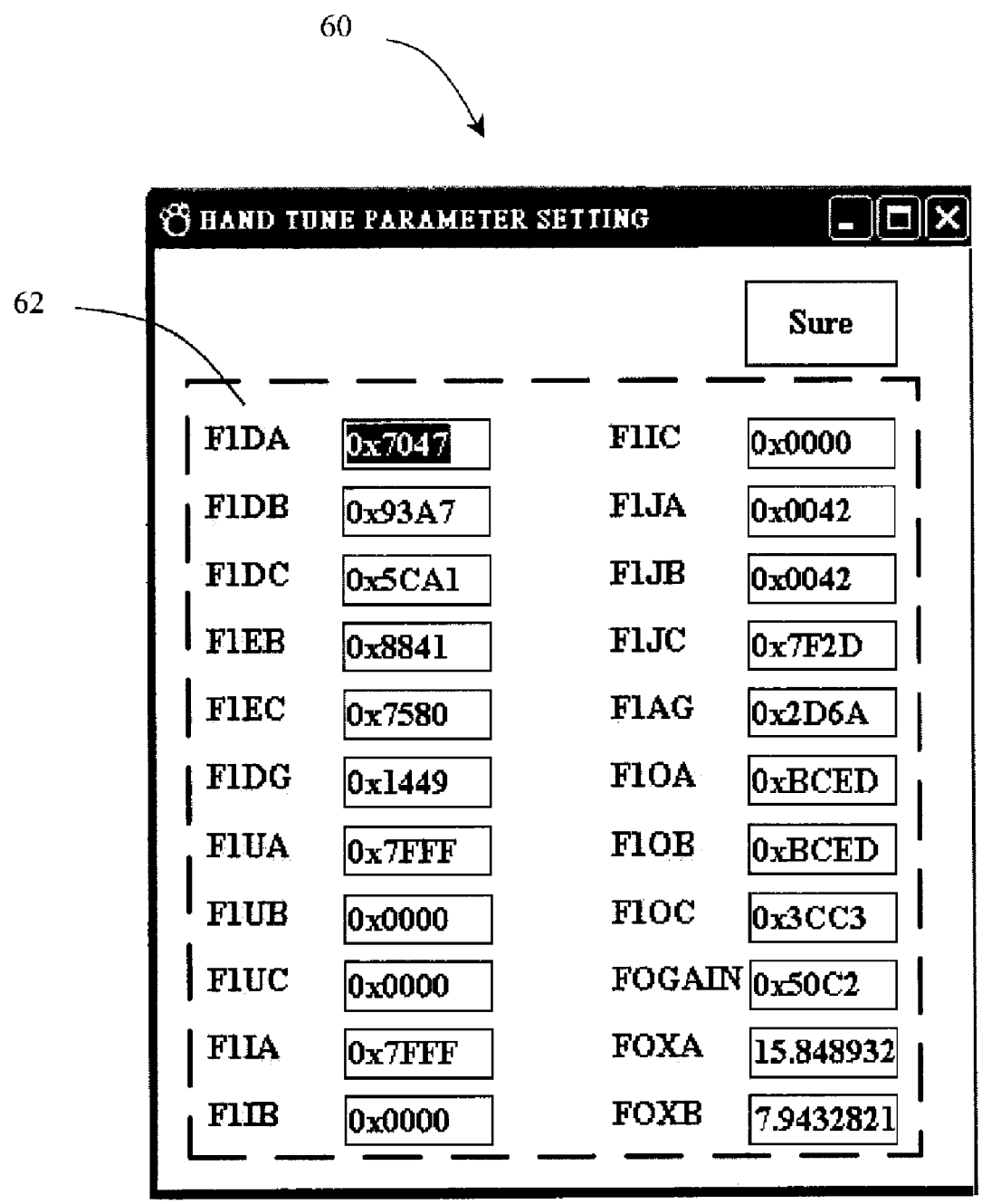
FIG. 9 is a schematic diagram showing a second interface of the parameters calibrating apparatus of FIG. 8.

Referring to FIG. 9, a manual-calibrating module 404 includes a second interface 60 for receiving a pending parameters value set. The second interface 60 includes a pending value setting 62 for receiving the pending parameters value set.

Figure 10:
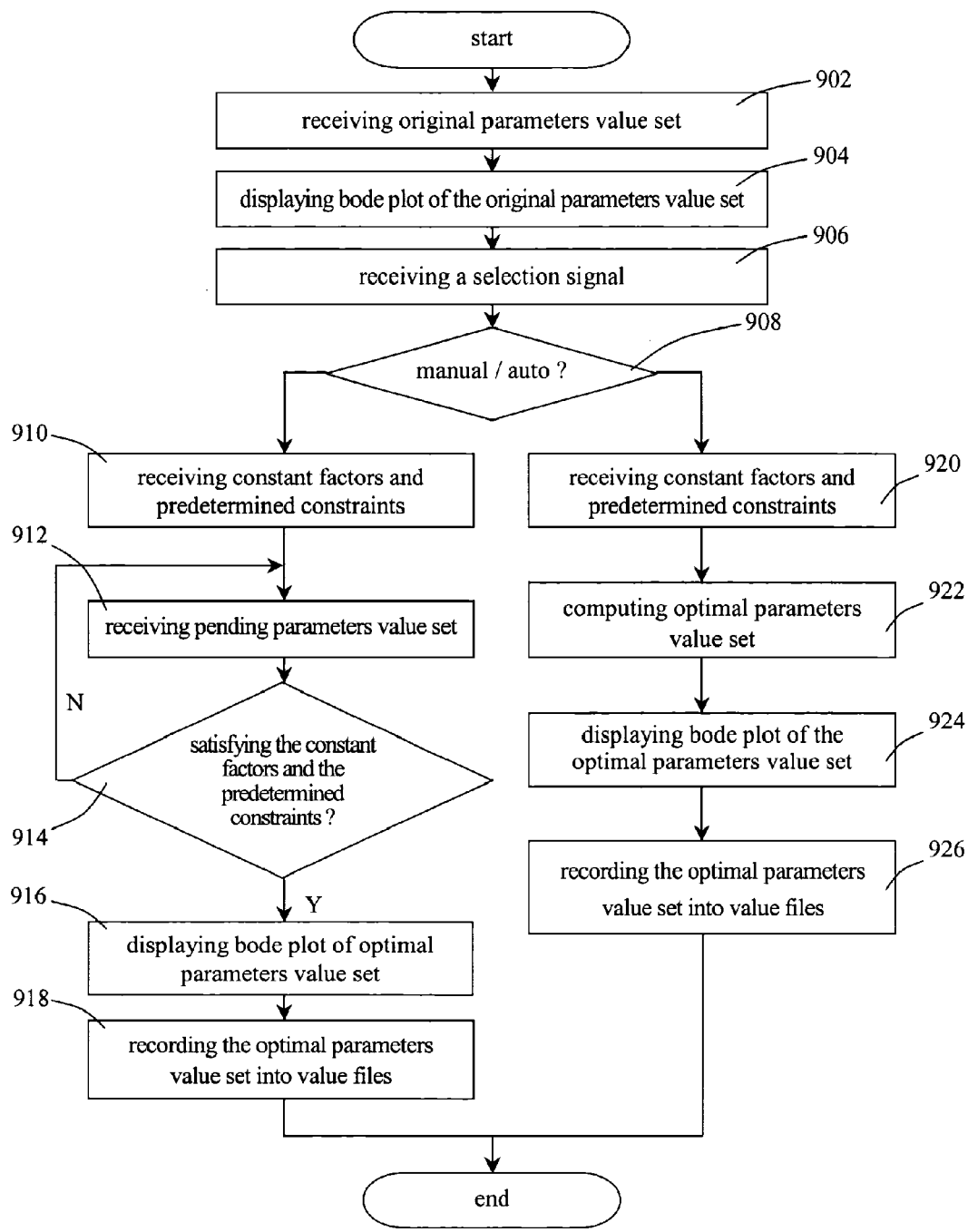
FIG. 10 is a process flow diagram illustrating a parameters calibrating method in accordance with a second preferred embodiment.

Referring to FIG. 10, a procedure of the parameters calibrating method implemented by the parameters calibrating apparatus 20 in accordance with the second preferred embodiment includes the following steps.

The displaying module 408 receives the original parameters value set (step 902).

The displaying module 408 displays a bode plot of the original parameters value set (step 904).

The selection module 401 receives a selection signal (step 906).

The selection module 401 selects either the manual-calibrating module 404 or the auto-calibrating module 402 based on the selection signal (step 908).

If the manual-calibrating module 404 is chosen, the manual-calibrating module 404 receives the constant factors and the predetermined constraints (step 910).

The manual-calibrating module 404 receives the pending parameters value set (step 912).

The manual-calibrating module 404 computes whether the pending parameters value set satisfies the constant factors and the predetermined constraints, if the pending parameters value set doesn't satisfy the constant factors and the predetermined constraints, the procedure goes back to step 912 (step 914).

If the pending parameters value set satisfies the constant factors and the predetermined constraints, the manual-calibrating module 404 sends the pending parameters value set to the displaying module 408. The pending parameters value set is identified as the optimal parameters value set, and the displaying module 408 displays a bode plot of the optimal parameters value set (step 916).

The manual-calibrating module 404 sends the optimal parameters value set to the creating module 406, and the creating module 406 records the optimal parameters value set into a value file having the predetermined format (step 918).

If the auto-calibrating module 402 is chosen, the auto-calibrating module 402 receives the constant factors and the predetermined constraints (step 920).

The auto-calibrating module 402 computes a plurality of optimal parameters value sets according to the original parameters value sets, the constant factors, and the predetermined constraints based on the GA, and sends the optimal parameters value sets to the displaying module 212 (step 922).

The displaying module 408 displays bode plots of the optimal parameters value sets (step 924).

The auto-calibrating module 402 sends the optimal parameters value sets to the creating module 406, and the creating module 406 records the optimal parameters value sets into value files having the predetermined format (step 926).

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. A parameters calibrating system for computing an optimal parameters value set for an optical disc drive, the parameters calibrating system comprising:
   a measuring apparatus for measuring the optical disc drive to get an original parameters value set;
   an input terminal for entering constant factors and predetermined constraints; and
   a parameters calibrating apparatus for computing the optimal parameters value set according to the original parameters value set, the constant factors, and the predetermined constraints, and outputting the optimal parameters value set to the optical disc drive;
   a creating module for receiving the optimal parameters value set, recording the optimal parameters value set into a value file having a predetermined format and recording the value file in the optical disc drive;
   wherein the parameters calibrating apparatus comprises an auto-calibrating module for computing the optimal parameters value set based on a genetic algorithm, and the auto-calibrating module comprises:
   means for generating a plurality of trial parameters value sets randomly;
   means for evaluating the plurality of trial parameters value sets according to the original parameters value set, the constant factors, and the predetermined constraints;
   means for sorting the plurality of trial parameters value sets according to the evaluating results;
   means for judging whether each of the plurality of trial parameters value set satisfies the predetermined constraints;
   means for identifying the plurality of trial parameters value sets satisfying the predetermined constraints as the optimal parameters value.

2. The parameters calibrating system according to claim 1, wherein the parameters calibrating apparatus comprises a displaying module for receiving the optimal parameters value set and displaying a bode plot of the optimal parameters value set.

3. The parameters calibrating system according to claim 1, wherein the auto-calibrating module further comprises:
   means for judging whether there is potential for an unsatisfied trial parameters value set;
   means for executing extinction and immigration for the unsatisfied trial parameters value sets if there is no potential for an unsatisfied trial parameters value set to be adjusted to satisfy the predetermined constraint, and going back to the step of evaluating.

4. The parameters calibrating system according to claim 1, wherein the auto-calibrating module further comprises:
   means for executing crossover and/or mutation for an unsatisfied trial parameters value sets if there is potential remaining for an unsatisfied trial parameters value set to be adjusted to satisfy the predetermined constraint, and going back to the step of evaluating.

5. The parameters calibrating system according to claim 2, wherein the parameters calibrating apparatus further comprises a manual-calibrating module for computing the optimal parameters value set manually.

6. The parameters calibrating system according to claim 5, wherein the parameters calibrating apparatus further comprises a selection module for receiving the original parameters value set and a selection signal, and determining which one of the auto-calibrating module and the manual-calibrating module is to be used based on the selection signal.

7. A parameters calibrating method comprising the steps of:

receiving an original parameters value set;
displaying a bode plot of the original parameters value set;
receiving constant factors and predetermined constraints via an auto-calibrating module;
computing a plurality of optimal parameters value sets;
displaying bode plots of the optimal parameters value sets;
recording the optimal parameters value set into a value file having a predetermined format;
receiving a selection signal;
choosing a manual-calibrating method or an auto-calibrating method based on the selection signal;
receiving the constant factors and the predetermined constraints via a manual-calibrating module, if the manual-calibrating method is chosen;
receiving a pending parameters value set;
judging whether the pending parameters value set satisfies the constant factors and the predetermined constraints;
displaying a bode plot of the pending parameters value set if the pending parameters value set satisfies the constant factors and the predetermined constraints, otherwise going back to the step of receiving a pending parameters value set.

8. The parameters calibrating method according to claim 7, further comprising the steps of:
recording the optimal parameters value set into a value file having a predetermined format.

9. The parameters calibrating method according to claim 7, further comprising the step of:
going back to the step of receiving a pending parameters value set if the pending parameters value set doesn't satisfy the constant factors and the predetermined constraints.

10. The parameters calibrating method according to claim 7, further comprising the steps of:
generating a plurality of trial parameters value sets randomly;
evaluating the plurality of trial parameter value sets according to the original parameters value set, the constant factors, and the predetermined constraints; sorting the plurality of trial parameters value sets according to the evaluating results;
judging whether each trial parameters value set satisfies the predetermined constraints;
identifying the trial parameters value sets satisfying the predetermined constraints as the optimal parameters value.

11. The parameters calibrating method according to claim 10, further comprising the steps of:
judging whether there is potential for an unsatisfied trial parameters value set;
executing extinction and immigration for the unsatisfied trial parameters value sets if there is no potential for an unsatisfied trial parameters value set to be adjusted to satisfy the predetermined constraint, and going back to the step of evaluating the plurality of trial parameters value sets according to the original parameters value set, the constant factors, and the predetermined constraints.

12. The parameters calibrating method according to claim 10, further comprising the steps of:
executing crossover and/or mutation for an unsatisfied trial parameters value sets if there is potential for an unsatisfied trial parameters value set to be adjusted to satisfy the predetermined constraint, and going back to the step of evaluating the plurality of trial parameters value sets according to the original parameters value set, the constant factors, and the predetermined constraints.

* * * * *